United States Patent [19]

Heyler

[11] Patent Number: 5,461,915
[45] Date of Patent: Oct. 31, 1995

[54] MOUNTING HOUSING MADE OF PLASTIC FOR POINTER-TYPE MEASURING UNITS

[75] Inventor: Adolf Heyler, Weigheim, Germany

[73] Assignee: Orka Optik GmbH, Weigheim, Germany

[21] Appl. No.: 327,093

[22] Filed: Oct. 21, 1994

[30] Foreign Application Priority Data

Oct. 23, 1993 [DE] Germany .............................. 9316219 U

[51] Int. Cl.⁶ ...................................................... G01L 7/08
[52] U.S. Cl. ........................................................ 73/431
[58] Field of Search ............................ 73/431, 493, 756, 73/732; 116/305, 309, 284; 29/595, 450, 451; 374/208

[56] References Cited

U.S. PATENT DOCUMENTS

| 3,527,102 | 9/1970 | Harland ...................................... 73/431 |
| 3,830,454 | 8/1974 | Debaigt ...................................... 73/431 |
| 5,341,684 | 8/1994 | Adams et al. .............................. 73/431 |

FOREIGN PATENT DOCUMENTS 2412737  12/1978  France .
3535526   4/1987  Germany .

Primary Examiner—R. Raevis
Attorney, Agent, or Firm—McGlew and Tuttle

[57] ABSTRACT

A mounting housing made of plastic is intended for pointer-type measuring units, especially for mechanical thermometers, barometers, hygrometers or the like, all of which have a central pointer shaft with a pointer movable over a ring dial. It includes an essentially cylindrical housing box (1) with a housing bottom (15) made in one piece with the rear side of a box wall (13) and with a front-side flange ring (2). The housing box is provided on the inside with elastically deflectable snap-in elements (24) for automatically holding an inserted measuring unit (20), and has ratchet-tooth-like fastening elements (23) on the outside to fasten it in a recess of a measuring instrument holder. To make it possible to insert and remove a measuring unit (20) in an easily deformable state of the box wall (13), but to also ensure a considerably higher dimensional stability of the housing box in the completely mounted state, the housing box (1) and the ring flange (2) are formed as separate individual parts, which are fitted together into a dimensionally stable assembly unit by detachable positive-locking connections (3). The ring flange (2) has, on the rear side, a double-walled centering ring (4), which is provided with an annular groove (8) that fittingly accommodates the open wall edge (14) of the inherently elastically deformable box wall (13) of the housing box (1).

10 Claims, 3 Drawing Sheets

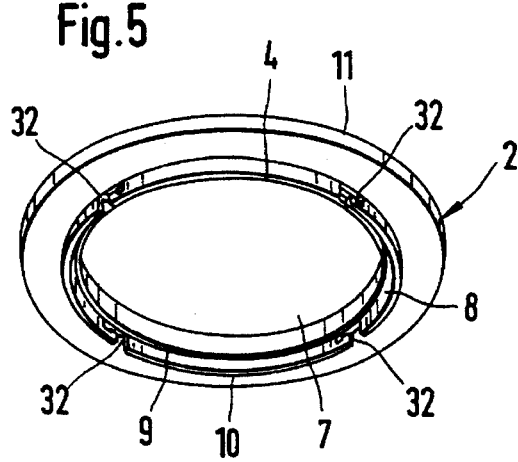
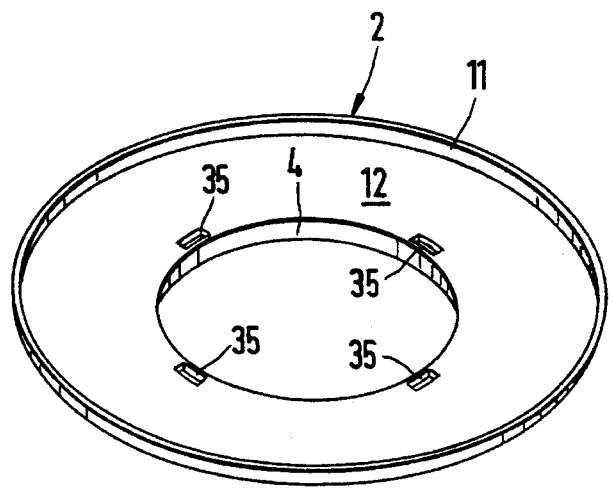
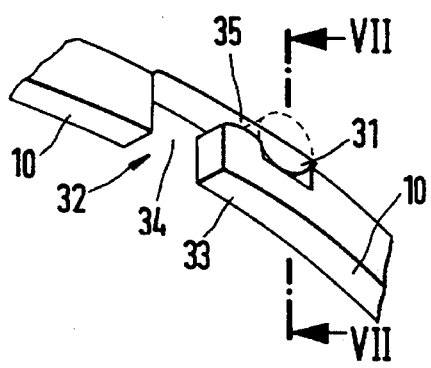
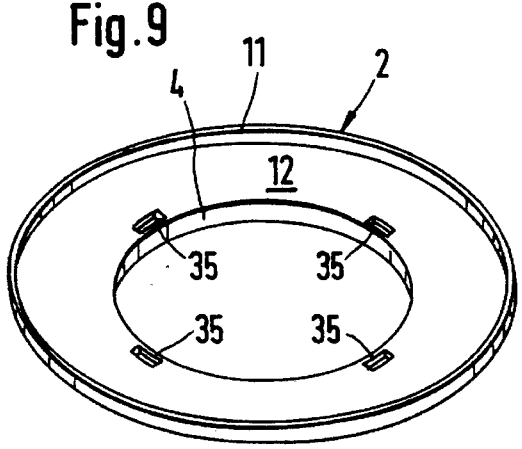
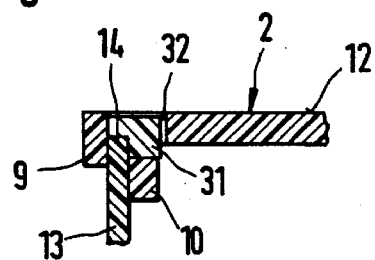

MOUNTING HOUSING MADE OF PLASTIC FOR POINTER-TYPE MEASURING UNITS

FIELD OF THE INVENTION

The present invention pertains to a mounting housing made of plastic for pointer-type measuring units for mechanical thermometers, barometers, hygrometers, and the like, all of which have a central pointer shaft with a pointer movable over a ring dial, consisting of an essentially cylindrical housing box that is open on the front side, with a housing bottom made in one piece with a wall of the box and with a front-side ring flange, which box is provided on the inside with elastically deflectable snap-in elements for automatically holding an insertable measuring unit, and is provided on the outside with ratchet-tooth-like fastening elements for fastening it in a recess of a measuring instrument holder.

BACKGROUND OF THE INVENTION

Pointer-type measuring units, i.e., measuring units with a rotating pointer as the indicating member, are arranged in mounting housings of this class such that the pointer of the measuring unit sweeps over a ring dial or circular dial, which is arranged on the front side of the flange ring and, depending on the design of the measuring instrument, it may have a larger or smaller diameter, to which the length of the pointer is also adapted.

In the prior-art mounting housings of this class, the flange rings are made in one piece with the essentially cylindrical housing boxes on the front side, so that the cylindrical box wall ends at the flange ring, on the one hand, and at the housing bottom, on the other hand, and it is therefore completely inelastic in the radial direction at least at the two ends. It is therefore also necessary to arrange the deflectable snap-in elements, especially ratchet teeth, on elastic tongues, which are movable in relation to the housing wall. These tongues may be made in one piece with the bottom of the housing box inside the housing box, but they may also be grooved or cut loosely by three-sided slitting in the area of the box wall, so that they are also able to move elastically in relation to the box wall in the radial direction. Aside from the fact that such tongues preserve the elasticity of movement even when the ratchet teeth fastened to them engage the parts of the measuring unit which are to be held and thus there is a relatively great risk of unintended spontaneous detachment, there have also been efforts to design such mounting housings such that different pointer-type measuring units, e.g., thermometers, barometers, hygrometers, and the like, can be optionally inserted. In addition, the same pointer-type measuring units are provided with pointers of different length or with ring dials with different diameters, so that a fitting, complete mounting housing must also be available for each ring dial with a defined diameter in the case of the prior-art mounting housings, even though the measuring unit itself and the housing box accommodating it could always have the same shape.

SUMMARY AND OBJECTS OF THE INVENTION

The primary object of the present invention is to design a mounting housing of the above-described class such that a measuring unit can be inserted into and removed from a readily elastically deformable state of the box wall, and that the box wall has a substantially higher dimensional stability in the completely mounted state and is able to absorb strong radial clamping forces.

This object is attained according to the present invention by the housing box and the ring flange consisting of separate individual parts, which are fitted together into a dimensionally stable assembly unit by detachable positive-locking connections, and the ring flange has, on the rear side, a double-walled centering ring with an annular groove, which fittingly accommodates the open wall edge of the inherently elastically deformable box wall of the housing box.

The design of the mounting housing according to the present invention imparts a high radial elasticity or elastic deformability to the box wall of the housing box, which makes it possible to make the snap-in elements, e.g., in the form of radially inwardly projecting ratchet teeth, which are necessary for fixing the pointer-type measuring unit, in one piece directly with the inside of the box wall, and to allow them to project relatively far in the inward direction, to enable them to also offer a secure hold for the measuring unit to be mounted. On the other hand, the positive-locking accommodation of the box wall edge in the double-walled centering ring makes it possible to completely eliminate the radial elasticity of the essentially cylindrical box wall with the placing on of the ring flange, so that the housing box, especially the box wall, which as a whole has the dimensional stability of a housing box connected in one piece to its ring flange, so that it is also suitable for being clampingly inserted into a mounting hole of a support plate, e.g., a cut wooden board or the like, without additional fastening means, e.g., screws or the like, being necessary for fixation. In addition, there is an advantage, namely, that the same housing box can be optionally provided, in its standard design, with different ring flanges, e.g., ring flanges of different size, which can be selected for measuring dials and pointers of different size. The replacement of a, e.g., damaged measuring unit is also substantially facilitated by the design according to the present invention. It is possible to remove the ring flange from the housing box in a simple manner to again impart the radial elasticity that was present at the time of mounting to the box wall, so that the detachment of the ratchet teeth holding the measuring unit in the housing box can be easily performed, as can the insertion and the fastening of the replacement measuring unit.

A very simple positive-locking connection is obtained by the design of the present invention wherein the positive-locking connection is formed by a plurality of radial pins arranged in a distributed pattern at the open wall edge of the wall box and by L-shaped recesses in the centering ring, wherein the radial pins can be introduced into the L-shaped recesses by a pushing and rotating movement to generate a self-holding clamping tension. This not only offers the advantage of not requiring any additional space in the inward or outward direction, but it also leads, in a simple manner, to a stable connection between the ring flange and the housing box, and, on the other hand, it can also again be detached relatively easily, especially without tools, for the purpose of disassembly.

The design of the present invention wherein at least two diametrically opposed ratchet teeth are made in one piece with the inside of the box wall as the snap-in elements, offers the possibility of achieving the interlocking of the snap-in elements with the measuring unit inserted or their detachment from the measuring unit inserted by a corresponding manual deformation of the box wall, so that no tools are needed for this purpose, either.

Using the design according to the invention wherein the housing box has a plurality of radially inwardly projecting clamping wedges as the fastening elements, which provides for clamping wedges with sharp end edges on the outside of the box wall, the housing box can be fastened in a cylindrical recess of a support plate, which recess has a corresponding internal diameter, with a correspondingly stable press fit in a simple manner.

The advantages of the mounting box according to the present invention can be utilized in the most effective manner due to the two types of use according to the invention, namely the inserting of the measuring unit into the housing box when the flange ring has been removed and has engaged with the ratchet teeth of the box wall and that the housing is subsequently fastened to the ring flange by engaging the radial pin with the L-shaped recesses of the centering pin or the use wherein the housing box is pushed coaxially into a cylindrical recess of a measuring instrument holder, the holder having a diameter that is somewhat smaller than the diameter on which the outer edge of the clamping wedges are located.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a perspective bottom view of the ring flange from FIG. 4, FIG. 6 is a perspective view of one of the positive-locking connections between the housing box and the ring flange, FIG. 7 is a section VII—VII from FIG. 6, and FIGS. 8–9 are perspective top views of two ring flanges with different external diameters.

DETAILED DESCRIPTION OF THE PREFERRED EMBODIMENT

Figure 1:
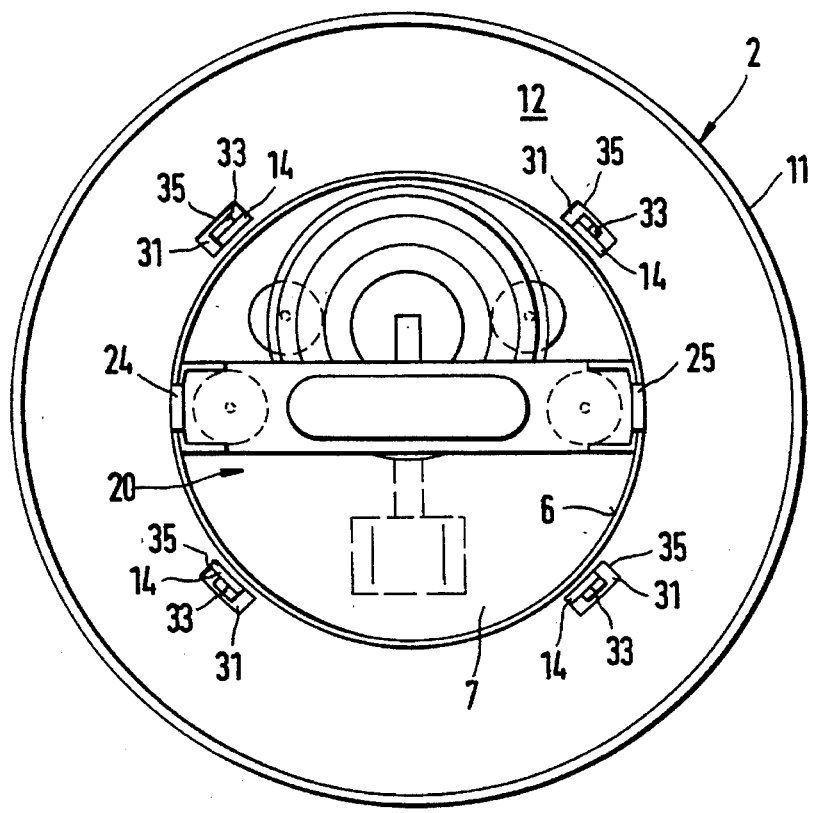
FIG. 1 is a front view of a mounting box with inserted measuring unit.

The mounting housing shown as an exemplary embodiment in the drawing is used to accommodate, by means of protecting and holding, pointer-type measuring units, e.g., thermometers, barometers, hygrometers, or the like. It is comprised of an essentially cylindrical housing box 1, as well as a flange ring 2, both of which are prepared as separate individual parts and are or can be fitted together into a dimensionally stable assembly unit by detachable positive-locking connections. The ring flange 2 is provided on the rear side, i.e., on the side facing the housing box 1, with a double-walled centering ring 4, which extends along the edge 6 of a round opening 7, whose diameter approximately corresponds to the internal diameter of the housing box. On its side facing the housing box 1, the centering ring 4 has an open annular groove 8, which is located between an inner ring wall element 9 and an outer ring wall element 10, wherein the latter has a somewhat greater axial length than the ring wall element 9.

On its outer circumference, the flange ring 2 is provided with a ring wall 11, which projects axially on the front side and surrounds or limits radially outwardly a flat ring surface 12, which is used to support or fasten indicating dials, not shown in the drawing.

The housing box 1, which is comprised of a one-piece plastic part, as the flange ring 2, has an essentially cylindrical box wall 13 with a thickness d of about 1 mm, which is open on the front side facing the ring flange 2 and ends with a flat, smooth ring wall edge 14. On the opposite side, the box wall 13 is provided with a radial housing bottom 15, which is made in one piece with it and has centering pins 16 and 17 of small axial height on its inside. In addition, the housing bottom 15 is provided with ventilation openings 18 and a suspension eyelet 18'. The centering pins 17 have respective holes 19 to receive, if necessary, fastening screws for fastening an inserted pointer-type measuring unit 20.

The box wall 13 is provided with a plurality of slot-like perforations, which ensure good ventilation of the interior of the housing box 1, which is necessary for thermometers, barometers and hygrometers. On its outside, the box wall 13 is provided with four clamping wedges 22, which are made in one piece with it, are offset by 90° in relation to one another, taper toward the housing bottom 15, and have the shape of a cone divided axially in half with sharp end edges 23.

Figure 2:
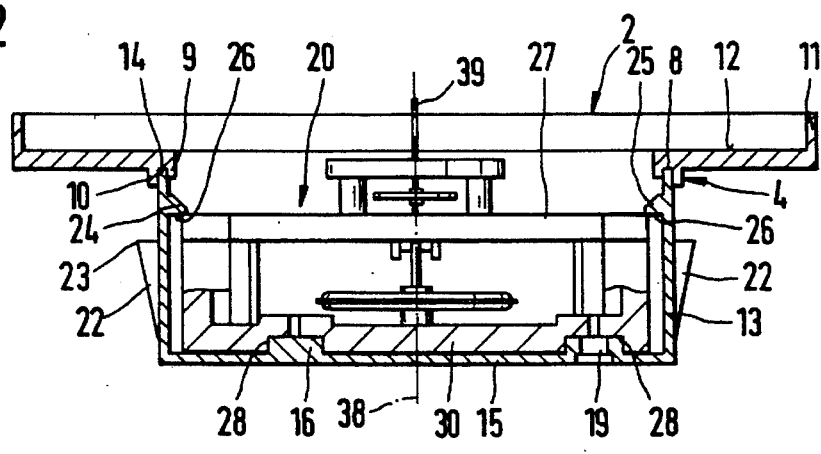
FIG. 2 is a section II—II from FIG. 1.
Figure 3:
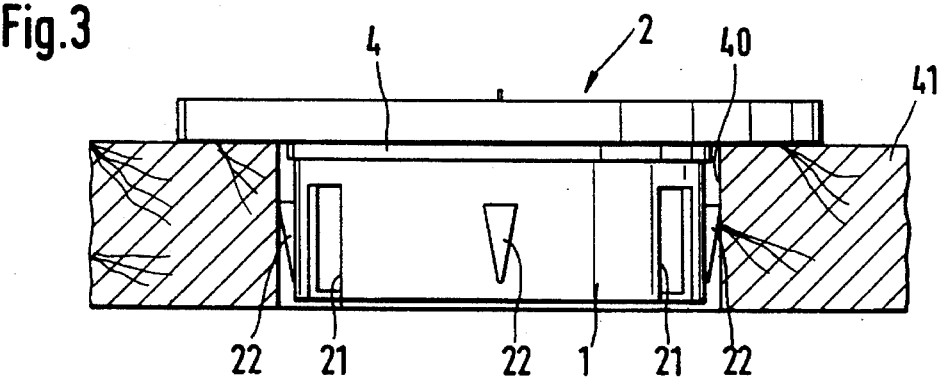
FIG. 3 is a mounting box inserted into a cylindrical hole of a support plate, whose sectional view is shown.

Two diametrically opposed ratchet teeth 24 and 25, which have a holding surface 26 each, extending in parallel to the housing bottom 15, are arranged on the inside of the box wall, and the ratchet teeth are arranged at such an axial distance from the housing bottom 15 that they are able to holdingly overlap an upper mount plate of the pointer-type measuring unit 20. As is apparent from FIG. 2, the pointer-type measuring unit 20 is provided with a lower base plate 30, which has, on its underside, depressions 28 used to centeringly accommodate the respective centering pins 16 and 17.

Figure 4:
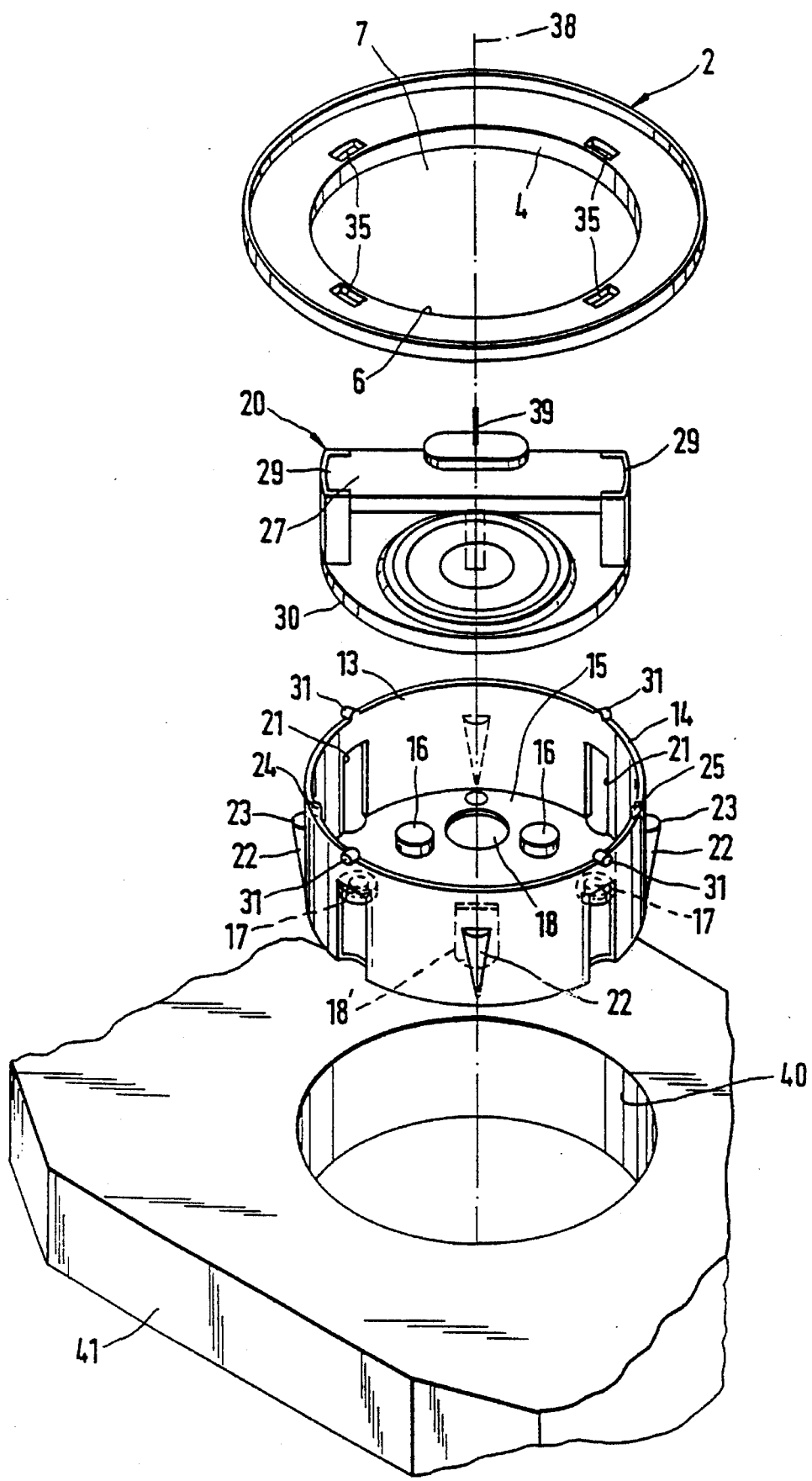
FIG. 4 is a perspective exploded view of a mounting box with measuring unit and support plate.

In its state shown in FIG. 4, without the flange ring 2 put on, the box wall 13 is elastically deformable in the radial direction because of its small wall thickness d and the property of the plastic selected, so that the ratchet teeth 24 and 25 can be pressed out in the radial direction with relative ease during the insertion of the pointer-type measuring unit 20. It is therefore also possible to allow the ratchet teeth 24 and 25 to project sufficiently far inwardly for their radial holding surfaces 26 to be able to sufficiently overlap the edge sections 29 of the mount plate 27 to guarantee reliable fixation of the pointer-type measuring unit 20 in the housing box 1.

To establish a reliable connection, which is, however, detachable at any time, between the housing box 1, on the one hand, and the ring flange 2, on the other hand, four radial pins 31, which are offset by 90° each relative to one another, are made in one piece with the wall edge 14 of the box wall 13, and the outer ring wall element 10 of the centering pin 4 is provided with four correspondingly arranged, L-shaped recesses 32, which form part of a respective snap-in tongue 33 running in the circumferential direction as part of the ring wall element 10. The recesses 32 is comprised of a section 34 each extending with parallel axis and of a section 35, which extends in the circumferential direction and represents a rectangular perforation in the top view of the flange ring 2. To fasten the flange ring 2 to the housing box 1, the radial pins 31 are introduced together into the vertical sections 34 of the L-shaped recesses 32, which are arranged in a correspondingly distributed pattern, until the wall edge 14 comes to lie on the bottom of the annular groove 8, after which the radial pins 31 are lockingly pushed over the snap-in tongues 33 by correspondingly rotating the housing box 1 around its own axis, which now already coincides with the axis of the flange ring 2, so that the radial pins 31 assume the position shown in FIG. 6, in which they are interlocked with one of the snap-in tongues 33, and in which they connect the flange ring 2 to the housing box 1 in a fixing manner.

It is easy to imagine that the flange ring 2 can again be detached from the housing box 1 by an reverse sequence of movements.

Not only is a structural unit formed by the connection of the flange ring 2 to the housing box 1, but an effect that is decisive for the further use of the housing box is also achieved, namely, the radial elasticity of the box wall 13 is eliminated due to the wall edge penetrating into the annular groove 8 of the centering pin 4 in a positive-locking manner when this connection is established, so that this the centering ring 4 is secured against any radial movement, and the housing box 1 as a whole will thus have a high radial stability. This dimensional stability is especially important when the completely mounted measuring instrument is to be fastened in, e.g., a cylindrical hole 40 of a support plate 41 made of, e.g., wood by means of the housing box 1 or the mounting housing and is to be fastened to the outer jacket of the box wall 13 by clamping wedges 22 by means of a press fit. It is only necessary to select the diameter of the cylindrical hole 40 to be smaller by about 1 to 1.5 mm than the diameter on which the sharp end edges 23 of the clamping wedges 22 are located, and to push the housing box 1 with the housing bottom 15 into the hole 40 in advance, so that the sharp end edges 23 will easily sink into the inner surface of the hole 40 of the support plate 41, which consists of, e.g., wood, and are thus able to ensure secure fitting of the entire mounting housing in the hole 40.

The two-component feature of the mounting housing offers the advantage that, on the one hand, the radial elasticity of its box wall 13 can be utilized to insert the pointer-type measuring unit 20 into the housing box 1 and to remove it from the housing box 1 to facilitate mounting, while, on the other hand, it is possible to eliminate this radial elasticity of the box wall 13, so that the housing box 1 can be fastened in a cylindrical hole 40 of a support plate with a tight press fit.

If it is impossible to detach the press fit established between the housing box 1 and the wall of the hole 40, it is possible in this state to remove the flange ring 2 from the housing box 1 by a corresponding rotary movement relative to the housing box 1 in order for its box wall 13 to regain its original radial elasticity and thus to enable it to be removed relatively easily from the hole 40.

One important aspect that is linked with the elimination of the radial elasticity of the box wall 13 is the fact that with the flange ring 2 in place, the ratchet teeth 24, 25 cannot be removed from their holding fit on the mount plate 27 of the pointer-type measuring unit 20, either, and removal even requires the removal of the ring flange 2 from the housing box 1.

Another advantage is the fact that ring flanges 2 with different external diameters and different openings 7, but identical centering rings 4 and connection elements 31/32 can optionally be connected to the housing box, so that it is also possible to provide various types of measuring units in the housing box 1 especially with pointers of different size, which fit on a central pointer shaft 39 of a pointer-type measuring unit 20 and rotate around the housing axis 38.

While a specific embodiment of the invention has been shown and described in detail to illustrate the application of the principles of the invention, it will be understood that the invention may be embodied otherwise without departing from such principles.

What is claimed is:

1. A mounting housing formed of plastic for a pointer-type measuring unit which has a central pointer shaft with a pointer movable over a ring dial, comprising: an essentially cylindrical housing box including a housing bottom formed in one piece with a box wall and with a housing box open wall edge, said housing box being provided with elastically deformable snap-in elements on an interior for automatically holding an inserted measuring unit, said housing box having ratchet tooth-like fastening elements on an exterior for fastening said housing box in a recess of a measuring instrument holder, said box wall of said housing box being elastically deformable; a ring flange, said ring flange being fitted to said housing box into a dimensionally stable assembly unit via detachable positive-locking connections, said ring flange having a rear side with a double walled centering ring forming an annular groove, said housing box open wall edge being fittingly accommodated in said annular groove.

2. Mounting housing according to claim 1, wherein said positive-locking connection is formed by a plurality of radial pins, said radial pins being arranged in a distributed pattern at said open wall edge of said box wall, said centering ring having L-shaped recesses wherein said radial pins are introduced into said L-shaped recesses by a pushing and rotating movement to generate a self-holding clamping tension.

3. Mounting housing according to claim 2, wherein said snap-in elements comprise at least two diametrically opposed ratchet teeth, made in one piece with an inside of said box wall.

4. A mounting housing according to claim 2, further comprising the assembly steps of: inserting a measuring unit into said housing box when said flange ring and said housing box are not assembled, said measuring unit being engaged with said snap in elements of said box wall; and subsequently fastening said housing box to said ring flange by engaging said radial pin with said L-shaped recesses of said centering pin.

5. Mounting housing according to claim 1, wherein said snap-in elements comprise at least two diametrically opposed ratchet teeth, made in one piece with an inside of said box wall.

6. Mounting housing according to claim 1, wherein said fastening elements on said box wall of said housing box include a plurality of radially inwardly projecting clamping wedges with sharp end edges, said clamping wedges tapering toward a housing bottom and being arranged in a distributed pattern on an exterior of said housing box.

7. A mounting housing according to claim 4, assembled by the further steps comprising inserting said housing box coaxially into said cylindrical recess of a measuring instrument holder, said measuring instrument holder having a diameter which is at most 1 to 1.5 mm smaller than a diameter on which said outer edges of said clamping wedges are located.

8. A method for assembling a mounting housing formed of plastic for a pointer-type measuring unit which has a central pointer shaft with a pointer movable over a ring dial, comprising the steps of:

providing an essentially cylindrical housing box including a housing bottom formed in one piece with a box wall and with a housing box open wall edge, said housing box including elastically deformable snap-in elements on an interior for automatically holding an inserted measuring unit, said housing box having rachet tooth-like fastening elements on an exterior, said box wall of said housing box being elastically deformable;

providing a ring flange provided having a rear side with a double walled centering ring forming an annular groove;

inserting a measuring unit into said housing box and engaging said measuring unit with said snap in element of said box wall;

fitting said ring flange to said housing box to form a dimensionally stable assembly unit via detachable positive locking connections including fittingly accommodating said housing box open wall edge in said annular groove.

9. A process according to claim 8, further comprising the steps of:

pushing said housing box coaxially into a cylindrical recess of a measuring instrument holder, said measuring instrument holder being dimensioned to have a diameter which is at most 1 to 1.5 mm smaller than a diameter defined by said fastening elements.

10. A process according to claim 8, further comprising forming said positive locking connections by employing a plurality of radial pins, said radial pins being arranged in a distributed pattern at said open wall edge of said box wall, said centering ring having L-shaped recesses, said radial pins being introduced into said L-shaped recesses.

* * * * *